US012626236B2

(12) United States Patent
Brennan et al.

(10) Patent No.: US 12,626,236 B2
(45) Date of Patent: May 12, 2026

(54) COMPUTER-IMPLEMENTED METHOD FOR DATA PROCESSING IN A FILTERED SPEND PROGRAM

(71) Applicant: Fidelity Information Services, LLC, Jacksonville, FL (US)

(72) Inventors: Joyce Brennan, Jacksonville, FL (US); James Batts, Jacksonville, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 174 days.

(21) Appl. No.: 18/449,058

(22) Filed: Aug. 14, 2023

(65) Prior Publication Data

US 2024/0311783 A1      Sep. 19, 2024

Related U.S. Application Data

(60) Provisional application No. 63/489,955, filed on Mar. 13, 2023.

(51) Int. Cl.
*G06Q 30/00* (2023.01)
*G06Q 20/12* (2012.01)
*G06Q 20/36* (2012.01)
*G06Q 20/40* (2012.01)

(52) U.S. Cl.
CPC .......... *G06Q 20/12* (2013.01); *G06Q 20/367* (2013.01); *G06Q 20/405* (2013.01)

(58) Field of Classification Search
CPC .................................................. G06Q 20/12
USPC ............. 705/41, 1.1, 40, 26.8, 14.26, 14.42; 455/433; 235/376
See application file for complete search history.

(56) References Cited

U.S. PATENT DOCUMENTS

| | | | | |
|---|---|---|---|---|
| 9,842,330 | B1 * | 12/2017 | Van Os ................ | G06Q 20/327 |
| 11,232,460 | B2 * | 1/2022 | Priest .................... | G06Q 30/02 |
| 2012/0221422 | A1 | 8/2012 | Sobek | |
| 2022/0391874 | A1 * | 12/2022 | Pezewski ............... | G06Q 20/26 |

OTHER PUBLICATIONS

IP.COM NPL Search History</i>.*
IP.COM NPL Search History.*
International Search Report issued in International Application No. PCT/US2024/019490 mailed Jun. 5, 2024 (3 pages).

* cited by examiner

*Primary Examiner* — John H. Holly
(74) *Attorney, Agent, or Firm* — Bookoff McAndrews, PLLC

(57)      ABSTRACT

Systems and methods are disclosed for data processing, data verification, and categorization of items. The method includes receiving a request from a first sub-system, wherein the request includes a plurality of data associated with an access device. Determining the first sub-system and/or the access device has the authorization to access a service. Determining contextual data of one or more purses associated with the access device and/or status of the first sub-system, wherein the contextual data includes an expiration date and/or rules associated with the one or more purses. Transmitting the request to a second sub-system based on the contextual data and/or the status of the first sub-system for categorizing one or more items associated with the request into one or more categories. Executing the request based on one or more categories.

18 Claims, 6 Drawing Sheets

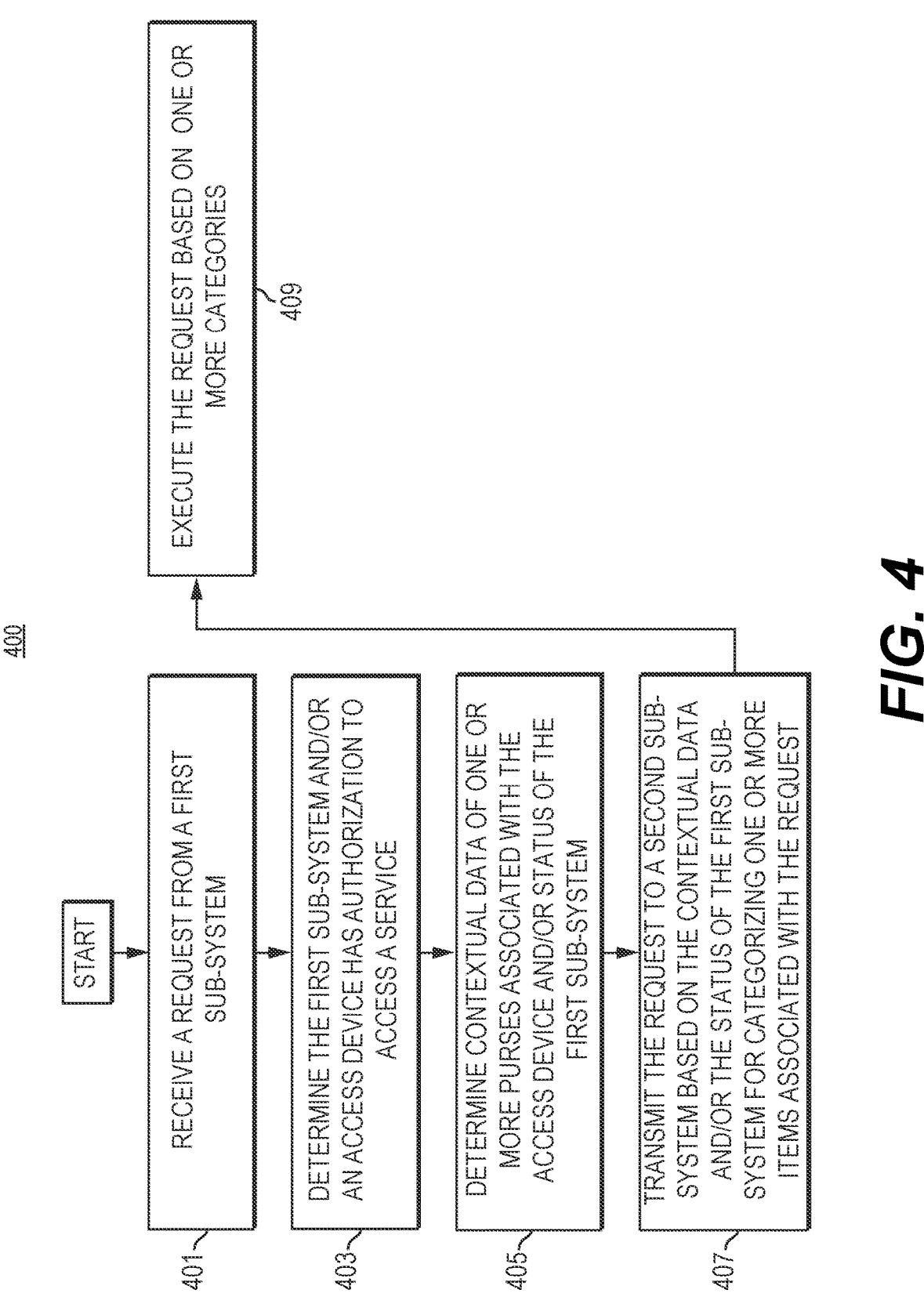

400

START

401 — RECEIVE A REQUEST FROM A FIRST SUB-SYSTEM

403 — DETERMINE THE FIRST SUB-SYSTEM AND/OR AN ACCESS DEVICE HAS AUTHORIZATION TO ACCESS A SERVICE

405 — DETERMINE CONTEXTUAL DATA OF ONE OR MORE PURSES ASSOCIATED WITH THE ACCESS DEVICE AND/OR STATUS OF THE FIRST SUB-SYSTEM

407 — TRANSMIT THE REQUEST TO A SECOND SUB-SYSTEM BASED ON THE CONTEXTUAL DATA AND/OR THE STATUS OF THE FIRST SUB-SYSTEM FOR CATEGORIZING ONE OR MORE ITEMS ASSOCIATED WITH THE REQUEST

409 — EXECUTE THE REQUEST BASED ON ONE OR MORE CATEGORIES

FIG. 4

COMPUTER-IMPLEMENTED METHOD FOR DATA PROCESSING IN A FILTERED SPEND PROGRAM

CROSS-REFERENCE TO RELATED APPLICATION(S)

This patent application claims the benefit of priority to U.S. Provisional Application No. 63/489,955 filed on Mar. 13, 2023, the entirety of which is incorporated herein by reference.

TECHNICAL FIELD

The present disclosure relates generally to the field of data processing and, more particularly, to systems and methods for executing authenticated filtered electronic transactions.

BACKGROUND

Current electronic transaction systems and services are continuously challenged to track, analyze, and/or categorize allowable product items associated with various prepaid benefits programs. The existing systems and services also experience technical difficulties in allowing select users to access funds after the expiration of purses that hold cash or virtual value for benefit programs. There has been an escalation in the occurrences of false matches due to an increase in the use of alphanumeric merchant identification (MID) numbers, and present technologies are limited in their capability to efficiently and accurately detect false matches. There is also a need for a system that adjusts the order of use of the purses of a subprogram within certain acceptable alternatives, including the suppression of the use of some purses for additional users of the benefit account. Existing technologies are technically challenged in pre-defining acceptable alternative priorities for subprograms or cardholders/users which presents challenges in limiting access to prevent misuse The present disclosure is directed to addressing these and other drawbacks to the existing electronic transaction systems and services.

Unless otherwise indicated herein, the materials described in this section are not prior art to the claims in this application and are not admitted to be prior art, or suggestions of the prior art, by inclusion in this section.

SUMMARY OF THE DISCLOSURE

The present disclosure solves this problem and/or other problems described above or elsewhere in the present disclosure and improves the state of conventional data processing methods by authenticating access devices and/or merchant systems and determining their contextual data for categorizing items associated with a transaction request.

In some embodiments, a system for data processing, data verification, and categorization of items is disclosed. The system includes: one or more processors; and at least one non-transitory computer readable medium storing instructions which, when executed by the one or more processors, cause the one or more processors to perform operations including: receiving a request from a first sub-system, wherein the request includes a plurality of data associated with an access device; determining the first sub-system, the access device, or a combination thereof has authorization to access a service; determining contextual data of one or more purses associated with the access device, status of the first sub-system, or a combination thereof, wherein the contextual data includes expiration date of the one or more purses, one or more rules associated with the one or more purses, or a combination thereof; transmitting the request to a second sub-system based, at least in part, on the contextual data, the status of the first sub-system, or a combination thereof for categorizing one or more items associated with the request into one or more categories; and executing the request based on the one or more categories.

In some embodiments, a computer-implemented method for data processing, data verification, and categorization of items is disclosed. The computer-implemented method includes: receiving, by one or more processors, a request from a first sub-system, wherein the request includes a plurality of data associated with an access device; determining, by the one or more processors, the first sub-system, the access device, or a combination thereof has authorization to access a service; determining, by the one or more processors, contextual data of one or more purses associated with the access device, status of the first sub-system, or a combination thereof, wherein the contextual data includes expiration date of the one or more purses, one or more rules associated with the one or more purses, or a combination thereof; transmitting, by the one or more processors, the request to a second sub-system based, at least in part, on the contextual data, the status of the first sub-system, or a combination thereof for categorizing one or more items associated with the request into one or more categories; and executing, by the one or more processors, the request based on the one or more categories.

In some embodiments, a non-transitory computer readable medium for data processing, data verification, and categorization of items is disclosed. The non-transitory computer readable medium stores instructions which, when executed by one or more processors, cause the one or more processors to perform operations including: receiving a request from a first sub-system, wherein the request includes a plurality of data associated with an access device; determining the first sub-system, the access device, or a combination thereof has authorization to access a service; determining contextual data of one or more purses associated with the access device, status of the first sub-system, or a combination thereof, wherein the contextual data includes expiration date of the one or more purses, one or more rules associated with the one or more purses, or a combination thereof; transmitting the request to a second sub-system based, at least in part, on the contextual data, the status of the first sub-system, or a combination thereof for categorizing one or more items associated with the request into one or more categories; and executing the request based on the one or more categories.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 4 is a flowchart of a process for authenticating access devices and/or merchant systems and determining their contextual data for categorizing items associated with a transaction request, according to aspects of the disclosure.

DETAILED DESCRIPTION OF EMBODIMENTS

Figure 1:
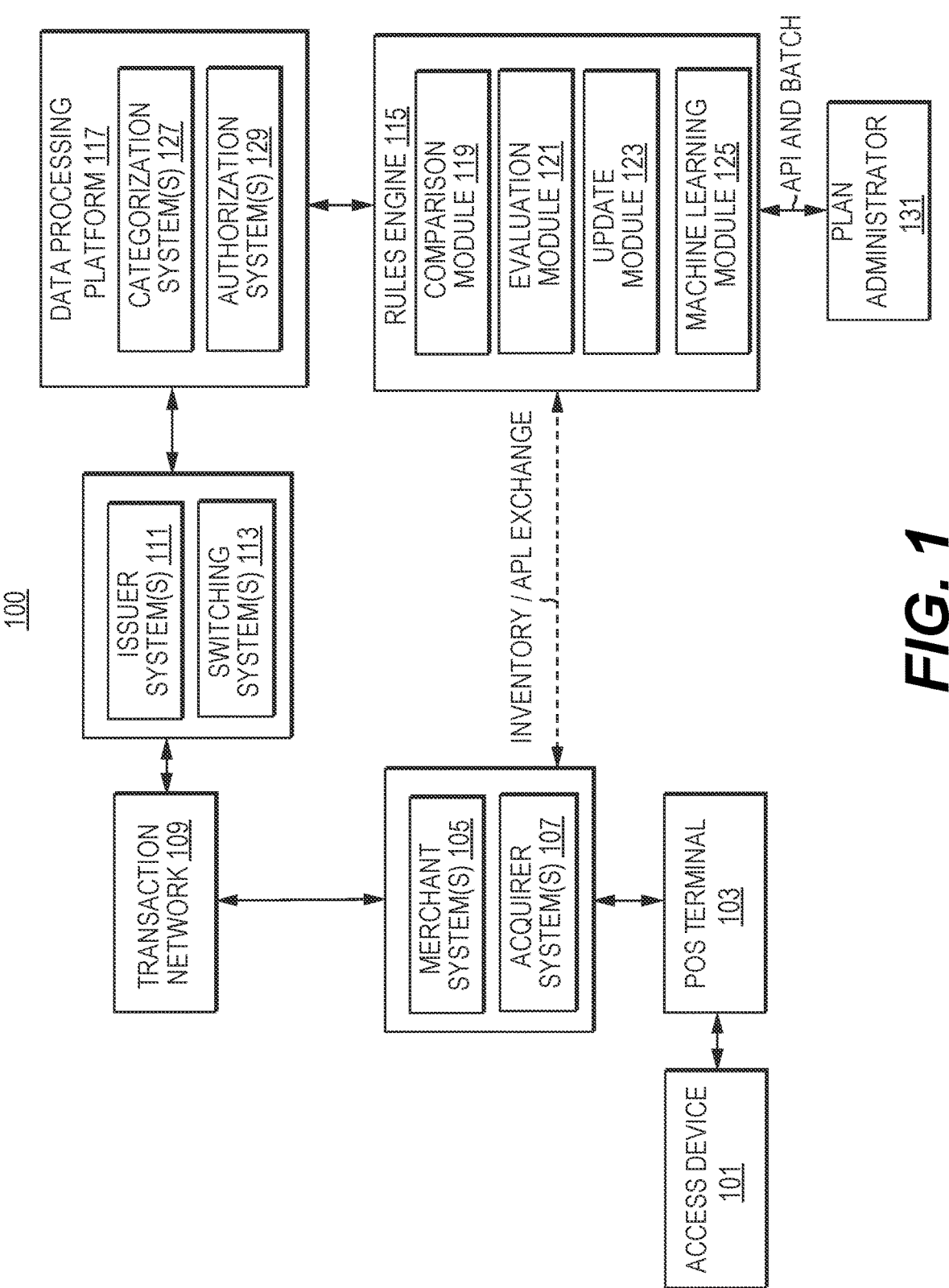
FIG. 1 is a diagram showing an example of a system that is capable of authenticating access devices and/or merchant systems for categorizing items associated with a transaction request, according to aspects of the disclosure.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for identifying where, when, and what items card funds may be applied by the cardholder or their dependent. This includes categorizing, in real-time or near real-time, items associated with an authenticated transaction request and matching them to accessible rules-based purses based on where, when, and who is permitted.

Various businesses offer access to prepaid benefits (or funds) to their beneficiaries. For example, government programs (e.g., Medicaid/Medicare, Supplemental Nutrition Assistance Program (SNAP), Special Supplemental Nutrition Program for Women, Infants, and Children (WIC), farmers markets, etc.), social programs (e.g., social security, child support, housing programs, etc.), disaster relief programs, insurance companies, manufacturers, general retailers, etc. may each provide prepaid benefits to encourage using their prepaid services. Conventional electronic payment/fund transaction systems are technically challenged to conveniently track, analyze, and/or categorize preapproved product items associated with various combinations of benefits programs accessed from a single card account.

Often benefits have a defined period of use with each benefit aligned to purses (e.g., electronic purses belonging to an access device which hold a certain amount of value, either cash or virtual value for a benefits program) which have an effective period of use. In certain circumstances, the expiration dates that prevent users (e.g., cardholders) from accessing funds blocks use of funds that may have been credited or purchase returns that may have been applied near or after the purse expiration date. For example, a merchant erroneously charges the user twice for a single transaction and later credits the overcharged amount to the purse associated with the user near or after the purse expiration date. Since the purse has expired, the amount or benefit associated with the amount cannot be accessed. It is technically challenging for the current electronic payment/fund transaction systems to grant select users the ability to access funds after the default expiration period for the purse because not all users are affected. Furthermore, issuing a separate card or creating a separate purse on the existing card to move the overcharged amount causes reconciliation issues for the benefit provider who may need to attribute the funds to the original benefit period, and as compliance needs evolve (e.g., for Centers for Medicare & Medicaid Services (CMS)) this may become unsupportable. Hence, the current electronic payment/fund transaction systems are technically challenged to provide a method that allows selected users to access funds for an additional period of time. For example, a method that supports service recovery for good faith credit scenarios after the end of the normal program effective period for a benefit, and allows users to access funds, e.g., the overcharged amount, for an additional period of time.

While benefits program design forms a standard set of rules for most recipients, the rules are not always one-size-fits-all, often there is a need for effective usage of the available funds for users based on their specific needs rather than rigid program rules, which inadvertently prevent the users from accessing the available funds. For example, program rules may require the users to utilize the funds in the food purse and then use the rewards funds. However, if the rewards funds are set to expire, the users may prefer to use the rewards funds before the funds in the food purse (e.g., to purchase food). Service providers (e.g., current electronic payment/fund transaction system) are technically challenged to pre-define an acceptable set of alternative priorities that the user can elect. There is a need for a system that alters the order of use of the purses of the subprogram (e.g., plan) within certain acceptable alternatives. There is also a requirement to limit access to the purses to prevent misuse when multiple users (especially minors) are associated with the primary account number (PAN). Certain benefits tied to the account should not be used by the secondary account users (e.g., a minor). For example, an employer transit benefits fund and/or a health savings account (HSA) is only to be used by the primary cardholder and should not be casually accessed by the secondary user.

The current electronic payment/fund transaction systems are technically challenged in updating the merchant match logic to prevent false matches, a situation aggravated by the more stringent needs of filtered spend (FS) programs. There are two basic causes: Imprecise matching and retailer growth (in locations). With the increase in merchant acquirers' use of alphanumeric merchant identification (MID) numbers, any current process utilizing merchant lists that are normalized to replace non-numeric characters with 0 in order to support merchant number ranges has intensified the number of occurrences of false matches to the service providers' merchant lists whether for inclusion, exclusion, remap, exception handling, or other capability. For example, MIDs ABC123, XYZ123, 0-0123, and so on are treated as if they are 000123. Even though this approach makes it possible to define a range of merchants in a single configuration rather than having to specify each MID individually, with alphanumeric MIDs such ranges are not possible. In practice, very few MID ranges are used, thereby rendering the use of range logic nearly irrelevant. Furthermore, due to the complications in the networks, one may have to frequently define new merchant category code (MCC) groups in which transactions are permitted. There is a need for an improved method of matching merchant IDs for all merchant lists in use for the programs.

Further, complaints about missed matches have been on the rise as retail groups expand their locations through mergers, acquisitions, or organic growth. For example, the rise in the number of FS programs has introduced occasions when subprograms (e.g., purses, wallets, etc.) are to be aligned with retailer partnerships so that all or only certain locations of the retailer should be allowed. An increase in programs targeted for restricted use to all locations of a specific merchant group is problematic if the MIDs of all applicable locations must be gathered as they would be recorded under each permissible network. However, the acquirer name for all of those locations typically follows a finite set of variants that are easier to discern, maintain, and assist in the qualification of the purse.

Collectively, there is an increase in programs that require specialized rules for purse selection or qualification based on both where the cardholder transacts or redeems their card based funds and the nature of what they purchase. This necessitates that the current MCC group and network name capabilities used throughout the programs be upgraded for better use during authorization. There is a need for a system that: (i) introduces a restricted authorization network (RAN) list with capabilities to support the requirement for specialized rules, (ii) reduces manual configuration to set up new programs with variant MCC and network needs, (iii) improves the accuracy of authorization to use the actual merchant Identifier to qualify a purse for use in a transaction, (iv) improves the ability to support a network of all "retailer name" merchants without the need to maintain a list of individual MIDs and/or (v) the pre-approved/allowed product items they are permitted to acquire with card funds.

To address these technical challenges, FIG. 1 implements advanced data processing, data verification, and data filtering capabilities into methods and systems for authenticating access devices and/or merchant systems and determining their contextual data for categorizing items associated with a transaction request. FIG. 1, an example architecture of one or more example embodiments of the present invention, may include a system 100 that comprises access device 101, point-of-service (POS) terminal 103, merchant system(s) 105, acquirer system(s) 107, transaction network 109, issuer system(s) 111, switching system(s) 113 which connects to rules engine 115 and data processing platform 117 (i.e., a filtered transaction processing system). The rules engine 115 and the data processing platform 117 may use information derived from messages from the POS terminal 103 and the merchant system(s) 105, delivered over the transaction network 109 to the issuer system(s) 111.

System 100 may apply sophisticated data processing, data verification, data validation, and data filtering techniques to track, analyze, and/or categorize, in real-time or near real-time, preapproved product items associated with various prepaid benefits programs. System 100 may provide an advanced method that enables users to access their funds after the normal expiration of the purses that hold cash or virtual value for the benefits programs. System 100 may also provide enhanced authentication mechanisms to efficiently and accurately detect false matches, thereby preventing occurrences of false matches due to the usage of alphanumeric MID numbers and/or through the use of merchant names. System 100 may implement sophisticated logic to pre-define an acceptable set of alternative priorities for subprograms and modifies the order of use of the purses of a specific card account within the acceptable alternatives. System 100 may generate rules that are specific to purses with multiple users, and prevents misuse of the purses by limiting access to some of the purses by additional users of the account. System 100 may also provide an improved method of matching merchant IDs that reduces the need to frequently define new MCC groups due to network complications. In such a manner, system 100 may address the technological shortcomings of the existing electronic transaction systems and services.

In one embodiment, the access device 101 may be a filtered transaction vehicle. The filtered transaction vehicle may be, for example, a credit card, a debit card, a gift card, a loyalty card, a bonus points card, a contactless payment device, a digital payment device, a digital wallet, etc. The filtered transaction vehicle may be used at any location, for example, brick-and-mortar stores, online e-commerce websites, e-commerce apps, etc., where the filtered transaction vehicle's sponsoring networks (e.g., New York Currency Exchange (NYCE), Visa®, MasterCard®, Discover®, other regional networks, etc.) may be accepted. In one embodiment, the access device 101 may include one or more user sub-accounts (e.g., purses, etc.) funded by a participating entity (e.g., a merchant, a bank, a company, a government agency, etc.). The access device 101 may be used at one or more merchant stores, online websites, or apps that may be associated with the filtered transaction vehicle issued by one or more participating entities (e.g., sponsoring or funding entities). In one embodiment, the filtered transaction vehicle may include functionality and aspects of both a filtered transaction vehicle and a non-filtered transaction vehicle (e.g., a standard credit or debit card). That is, a filtered transaction vehicle may be used anywhere the filtered transaction vehicle or a standard credit or debit card may be accepted. In another instance, a non-filtered transaction may be processed with all of the options described herein except the filtering of the items.

In one embodiment, the POS terminal 103 may be a traditional POS, an electronic cash register (ECR), or any mobile communication device (e.g., hand-held computers, desktop computers, laptop computers, wireless communication devices, cell phones, smartphones, mobile communications devices, a Personal Communication System (PCS) device, tablets, server computers, gateway computers, or any electronic device). The POS terminal 103 may collect transaction data (e.g., purchase transaction data) associated with the access device 101 upon a user (e.g., a customer, recipient, a beneficiary, etc.) submitting the access device 101 at the POS terminal 103, and may transfer the transaction data associated with the access device 101 to the merchant system(s) 105, and eventually reach the rules engine 115 and/or the data processing platform 117.

In one embodiment, the POS terminal 103 may be a standalone filtered transaction terminal (e.g., a stand beside/standalone terminal) or other non-integrated POS terminals that may be configured to accept filtered access devices. The POS terminal 103 may communicate with the merchant system(s) 105 to execute electronic transactions (e.g., purchase transactions) associated with the access device 101. Additionally or alternatively, the POS terminal 103 may communicate directly with the rules engine 115 and the data processing platform 117 to execute the electronic transactions of this disclosure. The rules engine 115 and the data processing platform 117 may be intermediaries in this system to ensure validity of a transaction request associated with the access device 101.

In one embodiment, the merchant system(s) 105 may include a payment terminal (e.g., a "pin pad"), or, a data server, for example, hosting a merchant's e-commerce (or online) store. Additionally or alternatively, the merchant system(s) 105 may collect, via an online or offline interface, the transaction data associated with the access device 101 and transmit the transaction data to the acquirer system(s) 107. The acquirer system(s) 107 may communicate with the issuer system(s) 111 via the transaction network 109 to execute one or more transactions based on the received transaction data.

In one embodiment, the rules engine 115 is a platform with multiple interconnected components. The rules engine 115 includes one or more servers, intelligent networking devices, computing devices, components, and corresponding software for authenticating, overriding, and/or updating data associated with a transaction request. In one embodiment, the rules engine 115 may include a comparison module 119, an evaluation module 121, an update module 123, and a machine learning module 125.

In one embodiment, the comparison module 119 may perform name matching during authorization settlement by providing the ability to include alphanumeric MIDs in the merchant lists in a manner to not invalidate the current lists by: (i) changing the authorization lookup to use the actual MID to determine a match, (ii) normalizing the MID upon determining there is no match and retry the lookup using the normalized value, or (iii) run a script to look for recent transactions approved based on the normalized MID, collect the original MID value, and perform a comparison. In another embodiment, the comparison module 119 may expand the current purse qualification logic to include merchant name matching logic (e.g., MCC and MID) and the ability to configure RAN lists via the automated client configuration (ACC). In one example embodiment, the comparison module 119 may change the merchant name matching logic to utilize the RAN list in qualifying a purse based on the MID and merchant name. For example, the authorization lookup is changed to use the RAN logic first, and if not matched, normalize the MID and retry the lookup using the normalized value. In one embodiment, the comparison module 119 may generate a report that identifies configured items (e.g. MCC group, network, or RAN list) under the client tree to show the items in the report that are needed to appropriately manage the programs. In one instance, an authorization system(s) 129 may consider the RAN approach to the merchant terminal IDs, inclusion/exclusion networks, exception lists, and substantiation rules. In one embodiment, the comparison module 119 via the machine learning module 125, may train a machine learning model to perform the name matching during authorization settlement.

In one instance, access device 101 may be an open-loop transaction vehicle that is accepted wherever their network brand (e.g. Visa®, MasterCard®, Discover®) is honored and a closed-loop transaction vehicle that is accepted only by the issuing merchant system. RAN bridges the gap between open and closed-loop access devices by building a restricted participating network of merchants where a transaction vehicle is used without any change on the acquiring side. In one instance, RAN allows customization of usage of the access device 101 to create unique cardholder offerings. With RAN, pinpoint targeting of payment card usage delivers control, flexibility, and accuracy. For example, RAN technology may create a sub-network on the open network (e.g., a network operated by Visa®, MasterCard®, Discover® operators), and may direct spending of open-loop transaction vehicle to only a select merchant or group of merchants. In many instances, RAN solutions are used to drive specific cardholder/consumer behaviors, such as an incentive program.

In one embodiment, the comparison module 119 may allow one or more clients to use ACC nodes to maintain the existing RAN list elements which parallels the existing account-to-account (A2A) calls used for creating and maintaining a set of data (e.g., country, MCC, MID, merchant name pattern, etc.). In one instance, the comparison module 119 may create a single ACC node for RAN list maintenance. The node would specify the list name, list subject (e.g. MCC, MID, merchant name), list type (include/exclude), and appropriate list values based on the subject. Each list is independent such that the item may appear once on a given list, but may appear on additional lists (protection against duplicating an item already on the list is provided). In one instance, the MCC list may accept 4 or 5-digit MCCs (e.g., MCC values in the list are verified against a map table), the MID list may accept alphanumeric IDs usable under the authorization/settle rules, the merchant name list may accept wildcards as prefixes, suffix, or mid name usable by authorization/settle rule.

In one embodiment, the evaluation module 121 may override the expiration date of a purse associated with the access device 101 with a new expiration date (e.g., predetermined additional days based on contextual information of the user). The evaluation module 121 may utilize an application programming interface (API) to set an alternate purse expiration date for a specific PAN and purse. Alternatively, the evaluation module 121 may remove the override and restore the default. For example, if users purchase items at the end of a benefit period and experience issues that require them to return or exchange the items, the credit applies to the original purse which may be expired. As discussed, re-opening expired purses for every user is impractical, moving the credit to an alternative purse may not match the required purse use rules, or moving the credit to the next period purse may violate certain regulatory limits by giving a full period of use. Therefore, the evaluation module 121 overrides the expiration date of a purse to extend the useful period of funds for an additional number of days, and give the users extra days to access those funds. In one instance, overriding the expiration date is based, at least in part, on historical user data (e.g., payment history, payment defaults, fraudulent activities, etc.), credit rating (e.g., credit history), user profile data (e.g., employment, salary, debt-to-income ratio, etc.), amount of the transaction, and so on.

In one embodiment, the evaluation module 121 via the machine learning module 125, may train a machine learning model to override the expiration date of a purse. In one example embodiment, the machine learning model may perform a comparative analysis of the transaction history, the card load patterns, the user profile data, and/or the amount of the transaction to make a decision to override the expiration date of a purse. In one embodiment, the evaluation module 121 may be directed to set an A2A and/or batch override of the expiration date. Once the expiration date is overridden, the evaluation module 121 may generate a non-monetary report that indicates the override action (e.g., the extension of the expiration date) with a specific reason and transaction code for review (e.g., by risk managers). Such non-monetary memo is included in reporting and data extracts. In one embodiment, the authorization system(s) 129 during authorization and settlement may apply the extended PAN purse expiration date rather than the subprogram default purse expiration date. In another embodiment, the authorization system(s) 129 may apply purse sweep logic to sweep latter of the PAN purse expiration date or the subprogram purse expiration date. In one instance, the customer service application (CSA) reflects the purse expiration based on the PAN purse expiration data upon reviewing the override or restoration of the purse expiration as a memo.

In one embodiment, the evaluation module 121 may perform a PAN level override or a card account number (CAN) level override for effective usage of the available funds or to prevent misuse of the funds. When a new card account is initially established or a subprogram is defined, the current configuration of purse priorities may be set to be applied to PANs/CANs as the default. In one embodiment, the evaluation module 121 may reconfigure the rules and purse priorities on the subprogram to allow up to five alternative priorities (e.g., default plus options A through E). Individual PAN/CAN holders via the plan administrator 131 may elect to apply one of the five alternative priorities (or return to the default) via an API to change the PAN/CAN priorities between default and configured alternates. At the CAN level, the replacements and renewals inherit the underlying CAN elected priority automatically. The PAN/CAN elected priority list is retrieved by an API and is included in non-monetary reports and data extracts for review. In one embodiment, the authorization system(s) 129 during authorization and settlement may look up the PAN/CAN to determine the appropriate priority set rather than apply the default purse priority (existing logic). While the default priority includes all purses, it is permitted to omit some of the purses for options A through E. In one example embodiment, if an account has an HSA benefit with a five-figure balance, a dependent (e.g., a minor) on the same account should not have access to the HSA funds, and the options set for the dependent card would be set (e.g., options A through E) to one that does not allow the use of the HSA purse. In another example embodiment, each purse may have dual priorities and those priorities may differ in each option set. For instance, an account may have HSA benefits and consumer funds. According to the rules applicable to those funds, the user elected to first use the HSA funds for medical purposes (e.g., hospital bills), and then utilize the other available funds where applicable until exhausted, then the HSA funds may be used to cover any residual portion of the purchase. However, if the user is flying for medical reasons, though the preference is to use transit enabled funds for the flight if available, the evaluation module 121 may reconfigure the rules to allow utilization of the HSA funds since the flying is for medical purposes.

In one embodiment, the evaluation module 121 via the machine learning module 125, may train a machine learning model to perform PAN/CAN level override for effective usage of the available funds or to prevent misuse of the funds. In one example embodiment, the machine learning model may analyze account profile of the users (e.g., primary account holder, secondary account holder) to determine access level to a benefit. In one example embodiment, the machine learning model may process transaction types and their purpose to determine purse priorities.

In one embodiment, the update module 123 may update existing purse based ACC nodes to apply RAN lists in place of MCC group (e.g., a set of MCCs) and networks. For example, MCC group may identify allowed sets of MCCs for a purse and MCC specific cash usage limits, network name may identify a list of remap merchants, exclude merchant network may identify up to 10 lists of MIDs to disqualify a transaction, and merchant terminal identifier (MTID) network purse may identify up to 10 lists of MIDs to disallow or override to allow. In one embodiment, the update module 123 may update MCC group with alternate RAN MCC group to define the MCC allowed on the purse (e.g., for each occurrence of an MCC group element, offer a RAN MCC group element set of up to 10 lists which may be inclusive or exclusionary in nature). In one embodiment, the update module 123 may update network name with alternate RAN network name to define possible merchants allowed on the purse (e.g., for each occurrence of a network name element, offer a RAN network name element set of up to 10 lists which may be inclusive or exclusionary in nature). In one instance, the exclude merchant network may not be necessary, as RAN MCC group may be an exclusion type. In one instance, MTID network purse may be compatible with RAN technology. In such manner, the update module 123 allows an alternate method to define and maintain MCC groups and network names for purse qualification, thereby enabling accurate configuration of the program to support refined authorization and settlement rules. In one embodiment, the update module 123 may add a subprogram identifier to select Merchant Include Exclude Qualifiers (MIEQ) over traditional targeted purse selection. For example, MCC MIEQ in place of MCC group on purse, MTID MID MIEQ in place of Network. In one embodiment, the update module 123 via the machine learning module 125, may train a machine learning model to update existing purse.

During purse qualification, the update module 123 may compare incoming MCC or MID to the purse configured MCC, MID, and merchant names allowed or disallowed by the one-to-many list. In one embodiment, the update module 123 may update targeted purse authorization strategies to utilize RAN lists instead of MCC group or network name. For example, application of the merchant network purse and the exclude merchant network configuration for inclusion or exclusion is updated to use the inclusion or exclusion RAN lists. In one instance, qualification of a purse based on inclusion RAN lists (e.g., MCC, MID, and merchant name) replaces the former MCC group and network name logic. As a result, without the existence of an exclude merchant network (effectively deprecated by RAN MCC exclusion) or MTID network, the update module 123 may:

a. Qualify a purse if the transaction MCC is on an include RAN MCC and not on an exclude RAN MCC list;

b. Qualify a purse if the transaction MCC is not disqualified based on RAN MCC lists but is allowed based on inclusion RAN MID or Merchant Name lists;

c. Disqualify a purse if the transaction is cleared based on the RAN MCC lists but is blocked based on the RAN MID and merchant name lists;

d. Provide the ability to configure a RAN list that is effectively MCC wide open while using a MID or merchant name exclusion; and/or e. Provide the ability to configure a RAN list that effectively blocks all MCC unless the MID or Merchant Name RAN list allows for their usage.

In another embodiment, the update module 123 may update the merchant network purse and the exclude merchant network configuration for inclusion or exclusion to use the inclusion or exclusion MIEQ lists. In one instance, the qualification of a purse based on the inclusion MIEQ lists (e.g., MCC, MID, merchant name, and Merchant Location) replaces the former MCC group and Network Name logic. As a result, without the existence of an exclude merchant network or MTID network, the update module 123 may:

a. Qualify a purse if the transaction MCC is on an include MIEQ MCC and not on an exclude MIEQ MCC list (i.e., equivalently to existing MCC group logic);

b. Qualify a purse if the transaction MCC is not disqualified based on MIEQ MCC lists but is allowed based on inclusion RAN MID or merchant name lists;

c. Disqualify a purse if the transaction is cleared based on the MIEQ MCC lists but is blocked based on the MIEQ MID, merchant name, or Merchant Location MIEQ Lists;

d. Provide the ability to configure a MIEQ list that is effectively MCC wide open while using a MID or merchant name exclusion; and/or e. Provide the ability to configure a MIEQ list that effectively blocks all MCC unless the MID or Merchant Name MIEQ list allows for their usage.

The use of a remap network (e.g., where MID is in the network and tied to an AMCC which must be validated against the purse MCC group to qualify) is eliminated. Instead, a purse may have up to 10 MID and 10 merchant name RAN lists. Conceptually, clients that use remap networks define RAN lists that are organized by effective AMCC; they may tie them to a purse as appropriate and therefore if a merchant appears on the MID or merchant name RAN tied to the purse, it qualifies. In one instance, by utilizing the RAN list for MCC lists, merchant ID lists, and to introduce merchant name pattern matching, the complexity of configuring and processing targeted transactions and the requirement for frequent manual maintenance are reduced. In addition, the data required to support many programs that require special handling based on "all locations" of a merchant is reduced. Furthermore, the accuracy of the authorization system(s) 129 is improved by using the actual MID number.

In one embodiment, the update module 123 may generate a report that provides RAN list details. The report may include RAN list names, subjects, types configured to the purse (and subprogram), and/or a list of elements on the RAN list. In one instance, customer service application (CSA) purse details provide an opportunity for the clients or agents to review the transactions against the support MCC, MIDs, cash tracks, and integrated inventory approval system (IIAS) categories or Filtered Spend (FS) categories. In one embodiment, the update module 123 may update the CSA purse details to show RAN information in a purse detail view. For example, the CSA purse detail MCC page may include the MCCs in the MCC include and exclude indications. For example, the purse detail MID page may be corrected to show MID numbers and include the RAN MID numbers with include/exclude indications. For example, a new Merchant Name page may be updated to identify the merchant name RAN include/exclude list. For example, a new MTID page may be updated to reflect the MTID configuration. In one instance, the ability to support IIAS or FS category groupings need to be directly assignable for the subprogram so that new combinations can be setup dynamically. In one embodiment, the update module 123 may create a new capability of RAN list subjects via the ACC node that support substantiation rules for IIAS, FS, or other substantiation types that are triggered based on MCC groups and networks.

Figure 5:
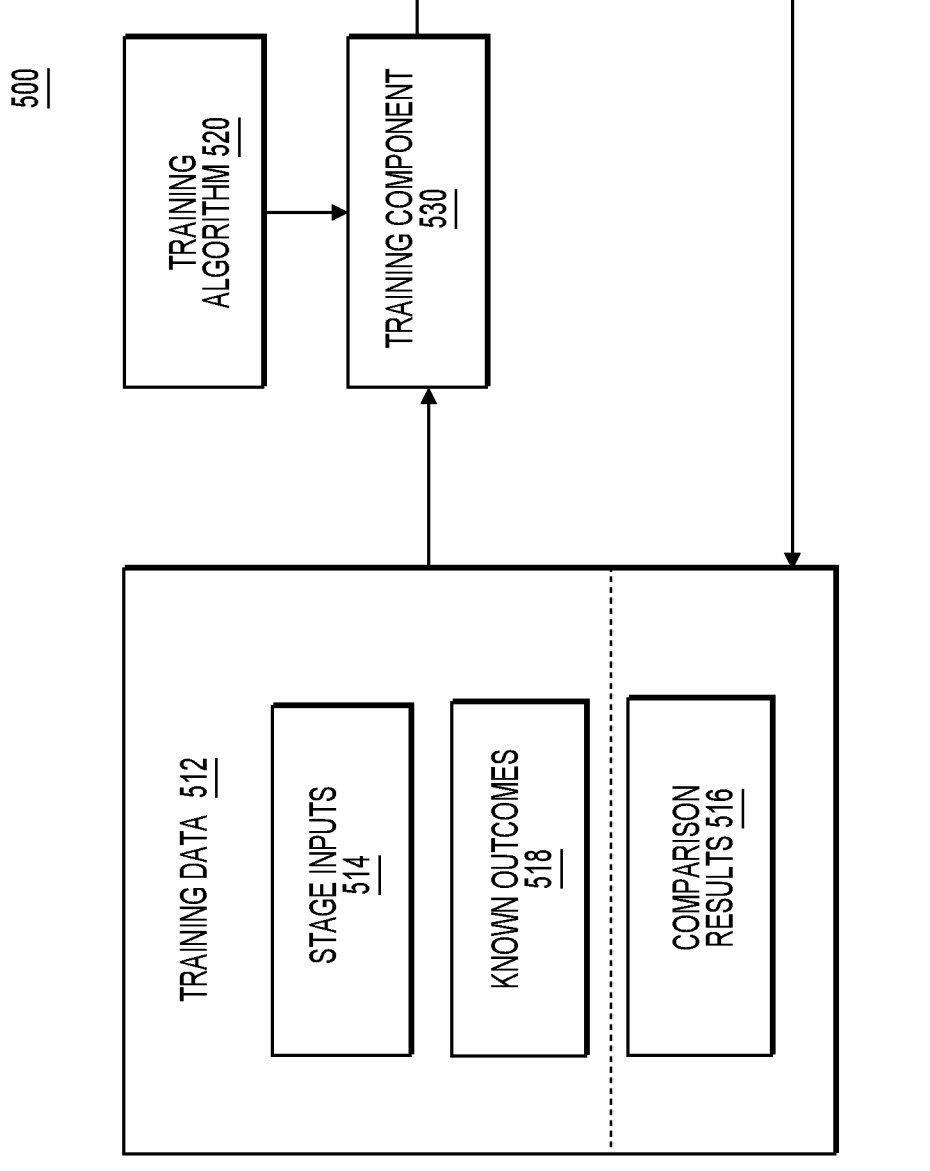
FIG. 5 shows an example machine learning training flow chart.

In one embodiment, the machine learning module 125 performs model training using training data (e.g., from FIG. 5 training data 512 illustrated in the training flow chart 500) that contains input and correct output, to allow the model to learn over time. The training is performed based on the deviation of a processed result from a documented result when the inputs are fed into the machine learning model, e.g., an algorithm measures its accuracy through the loss function, adjusting until the error has been sufficiently minimized. In one embodiment, the machine learning module 125 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 125 implements various machine learning techniques, e.g., k-nearest neighbors, cox proportional hazards model, decision tree learning, association rule learning, neural network (e.g., recurrent neural networks, graph convolutional neural networks, deep neural networks), inductive programming logic, support vector machines, Bayesian models, etc. In one embodiment, the machine learning module 125 may run complex data analysis, rules, and/or predictive modeling on historic data to learn data routing, user authentication, and/or transaction authorization. For example, the machine learning module 125 may identify, in real-time or near real-time, any irregularities in regular transactions and user authentication.

Figure 6:
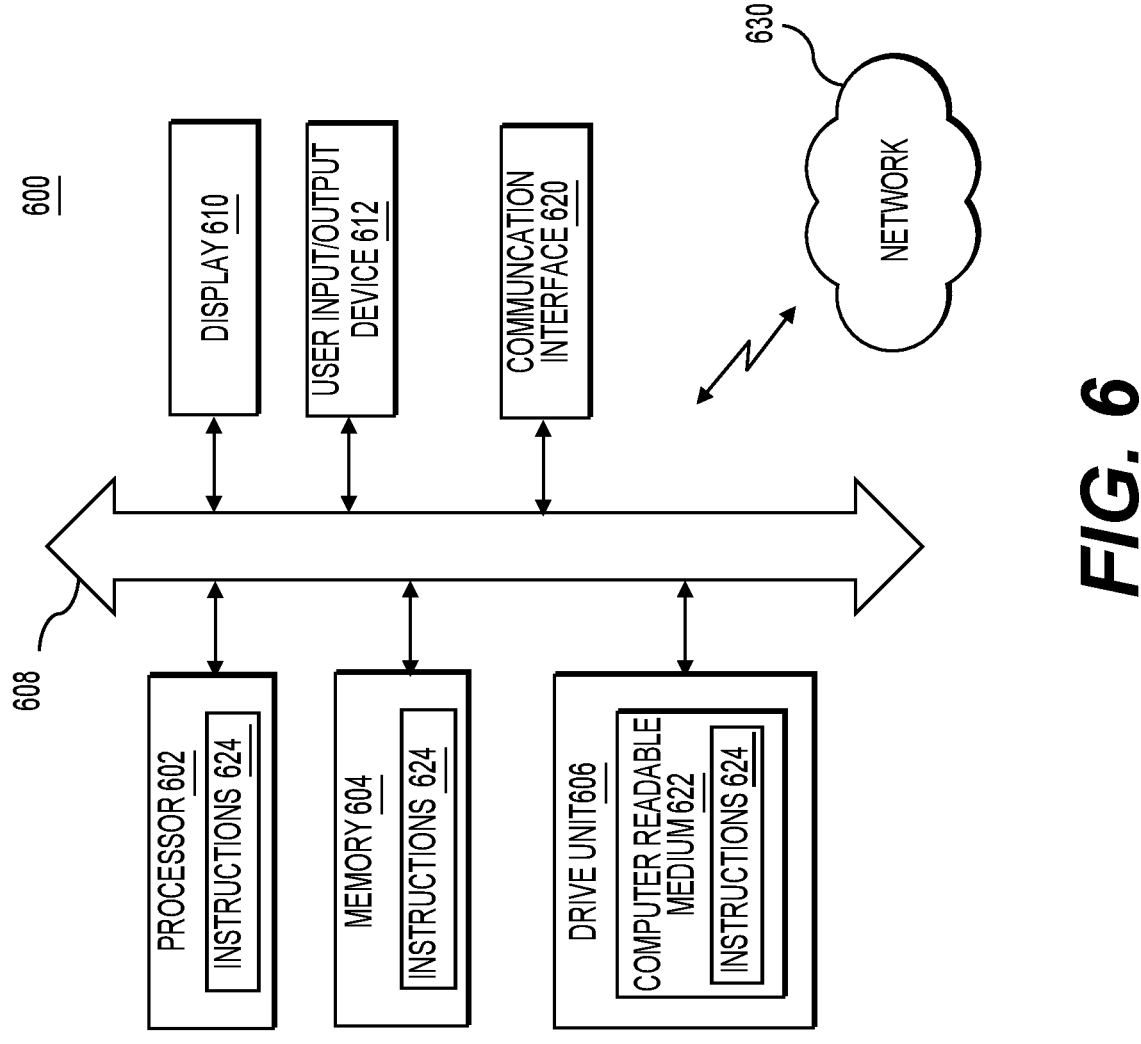
FIG. 6 illustrates an implementation of a computer system that executes techniques presented herein.

As used herein, terms such as "module" or "component" generally encompass hardware and/or software, e.g., that a processor or the like used to implement associated functionality. The above presented modules and components of the rules engine 115 are implemented in hardware, firmware, software, or a combination thereof. Though depicted as a separate entity in FIG. 1, it is contemplated that the rules engine 115 is also implemented for direct operation by computer system 600 (FIG. 6). As such, the rules engine 115 generates direct signal inputs by way of the operating system of the computer system 600. The various executions presented herein contemplate any and all arrangements and models.

In one embodiment, the rules engine 115 may transmit authenticated and updated data to the data processing platform 117. In one embodiment, the data processing platform 117 is a platform with multiple interconnected components. The data processing platform 117 includes one or more servers, intelligent networking devices, computing devices, components, and corresponding software for filtered transactions that allow participating members to purchase filtered items from participating entities. In one embodiment, the data processing platform 117 may include categorization system(s) 127 and authorization system(s) 129.

In one embodiment, the acquirer system(s) 107 may include a standalone acquirer system and/or an integrated acquirer system that may be configured to receive transaction data from the merchant system(s) 105. The acquirer system(s) 107 may receive, from the POS terminal 103 and/or merchant system(s) 105, a transaction request associated with the access device 101. The transaction request may include, for example, a request to authorize a purchase/payment transaction. The acquirer system(s) 107 may then determine whether the access device 101 is a filtered transaction vehicle or a non-filtered transaction vehicle. The acquirer system(s) 107 may communicate with the issuer system(s) 111 and the transaction network 109 to complete the transaction request.

In one embodiment, the switching system(s) 113 may determine whether the transaction request includes enhanced data, lite-enhanced data, or non-enhanced data. In one embodiment, the enhanced data may include, for example, Stock Keeping Unit (SKU) level data (i.e., UPC for Universal Product Code, aka full cart data). The SKU is a unique identifier for an item sold or provided by a merchant or a filtered transaction participating entity. In some embodiments, enhanced data may be required to facilitate the filtered transaction process of this disclosure. In one instance, if the transaction request includes lite-enhanced data or non-enhanced data, the switching system(s) 113 may transmit the transaction request to the authorization system(s) 129 to complete the transaction request. In one instance, if the transaction request includes enhanced data (e.g., SKU level data), the switching system(s) 113 may transmit the transaction request with the enhanced data to the categorization system(s) 127.

In one embodiment, the categorization system(s) 127 may analyze and/or categorize the transaction data associated with (e.g., included in) the received transaction request. In one embodiment, the categorization system(s) 127 includes an approved product list (APL) database 229 and a categorization engine 231, which are discussed below in FIG. 2. In one embodiment, the acquirer system(s) 107 may, via the transaction network 109 connect to the issuer system(s) 111 after switching system(s) 113, which in turn transmits the transaction request to the categorization system(s) 127 and/or the authorization system(s) 129. The categorization system(s) 127 would then via the switching system(s) 113 transmit the analyzed and/or categorized transaction data to the authorization system(s) 129. The authorization system(s) 129 then communicates the response of the issuer system(s) 111 via the transaction network 109 to complete the transaction request, discussed in detail below.

Figure 2:
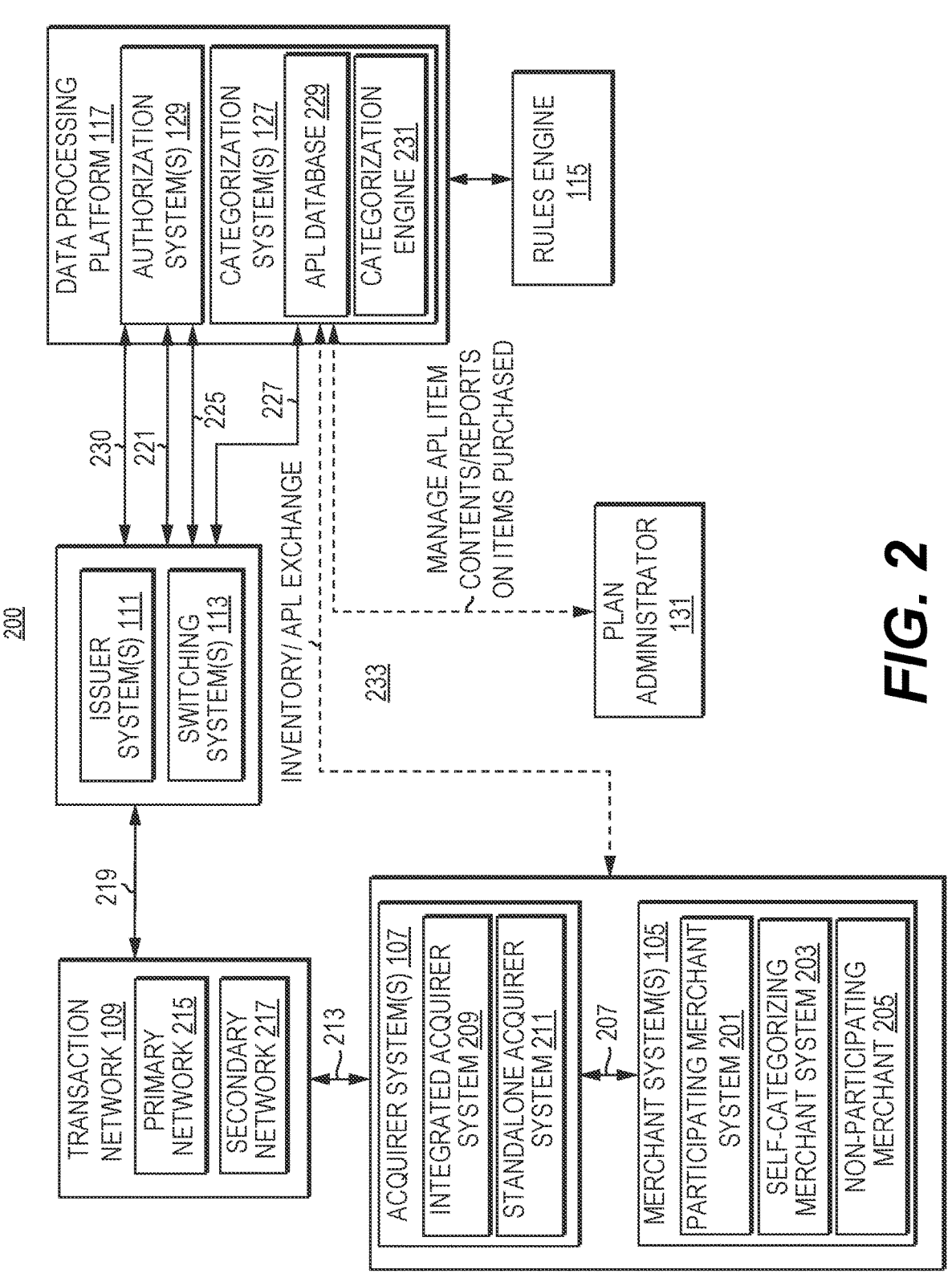
FIG. 2 illustrates a filtered transaction process, according to aspects of the disclosure.

FIG. 2 illustrates a filtered transaction process 200, according to aspects of the disclosure. FIG. 2 depicts a more detailed example illustration of the system 100, but should not be construed as limiting the system 100. In one embodiment, the merchant system(s) 105 may include a participating merchant system 201, a self-categorizing merchant system 203, and/or a non-participating merchant system 205. In step 207, the participating merchant system 201 may utilize a standalone filtered transaction terminal (e.g., a standalone terminal) or other integrated POS terminals that may be configured to accept the filtered access devices of this disclosure. For example, the participating merchant system 201 may utilize an integrated acquirer system 209 or a standalone acquirer system 211 of the acquirer system(s) 107 to convey enhanced data for filtered spend using the primary network 215 to reach the issuer system(s) 111. At the issuer system(s) 111 the switching system(s) 113 may connect with the data processing platform 117, which, using data from the rules engine 115, may facilitate one or more electronic transactions (e.g., a purchase transaction) of this disclosure. In one instance, the non-participating merchant system 205 may typically use POS terminal 103.

In step 213, the acquirer system(s) 107 may determine whether to transmit the transaction request via a primary network 215 or a secondary network 217. For example, if the transaction data includes enhanced data (e.g., SKU level data), the acquirer system(s) 107 may transmit the transaction request to the primary network 215 (e.g., NYCE network). At step 219, the primary network 215 may then transmit the transaction request with the enhanced data to the switching system(s) 113. If the transaction data does not include any enhanced data, the acquirer system(s) 107 may transmit the transaction request via either the primary network 215 (e.g., NYCE network) or the secondary network 217 (e.g., Visa, MasterCard®, Discover®, other regional networks, etc.). At step 221, the secondary network 217 may transmit the transaction request without enhanced data directly to the authorization system(s) 129 to complete the transaction request without routing the transaction request to the switching system(s) 113.

In another embodiment, the self-categorizing merchant system 203 may communicate with the acquirer system(s) 107 to facilitate one or more electronic transactions (e.g., purchase transactions) in accordance with this disclosure. In one embodiment, the self-categorizing merchant system 203 may request to participate in one or more aspects of the filtered transaction process of this disclosure. However, the self-categorizing merchant system 203 may not be configured to transmit the required enhanced data (e.g., SKU level data) through the acquirer system(s) 107. In this embodiment, the self-categorizing merchant system 203 may transmit self-categorized data (or lite-enhanced data), along with the transaction request, to the acquirer system(s) 107. The self-categorized data may be data categorized by the self-categorizing merchant system 203 that corresponds to one more items carried or provided by the self-categorizing merchant system 203. The self-categorized data may include one or more filtered items that may correspond with categorization data stored in the categorization system(s) 127. In step 213, the acquirer system(s) 107 may transmit the transaction request including the self-categorized data to the primary network 215 (e.g., NYCE network) or the secondary network 217 (e.g., MasterCard network). The primary network 215 or the secondary network 217 may then transmit the transaction request including the self-categorized data to the switching system(s) 113 (step 219) or the authorization system(s) 129 (step 221) then complete the transaction request with the issuer system(s) 111.

As previously discussed, the switching system(s) 113 may determine whether the transaction request received from the primary network 215 includes enhanced data, lite-enhanced data, or non-enhanced data. At step 225, the switching system(s) 113 may determine the transaction request includes lite-enhanced data or non-enhanced data, and may transmit the transaction request to the authorization system(s) 129 to complete the transaction request with the issuer system(s) 111. At step 227, the switching system(s) 113 may determine the transaction request includes enhanced data (e.g., SKU level data), and may transmit the transaction request with the enhanced data to the categorization system(s) 127. In one embodiment, the categorization system(s) 127 may include an approved product list (APL) database 229 and a categorization engine 231. The APL database 229 may store one or more APL lists associated with the access device 101 (e.g., a filtered transaction card), and/or one or more filtered transaction participating entities (e.g., a bank, a company, a government agency, etc.). The APL Database may have obtained participating merchant system 201, or self-categorizing merchant system 203 product inventory to enable categorization of enhanced data received.

In one embodiment, the categorization system(s) 127 may manage the contents of the APL lists stored in the APL database 229. The APL lists may include, for example, approved Universal Product Codes (UPC), Price Look-Up (PLU) codes, comparable product identifiers (e.g., maker codes), and/or cross references to categories of products identified by the system 100. A participating merchant, or any filtered transaction participating entities, may add filtered items to, or remove filtered items from an APL list based on changes to inventory items via one or more interfaces. In one embodiment, a single item may be associated with a single category on a given APL list. Additionally, a card bank identification number (BIN) of a filtered transaction vehicle (e.g., the access device 101) may be associated with one or more specific APL lists. The categorization system(s) 127 may also provide one or more APL lists to the merchants who may request to self-categorize and/or organize the categorization data. In one embodiment, the categorization system(s) 127 may be configured to provide one or more APIs which may be utilized by one or more merchants or entities that may participate in the filtered transaction process of this disclosure. The one or more APIs may be configured to respond to a user inquiry (e.g., item identification by scanning a UPC code by a client, a client app utilizing the API to lookup whether an item is covered by the filtered transaction process, etc.). In one embodiment, one or more APIs may enable the display of graphics primitives such as icons, bar graphs, menus, buttons, data entry fields, etc. In another embodiment, one or more APIs may cause interfacing of guidance information to include, at least in part, one or more annotations, audio messages, video messages, or a combination thereof. In one example embodiment, one or more API operates in connection with augmented reality (AR) processing techniques, wherein various applications, graphic elements, and features interact.

At step 227, the categorization engine 231 may receive the transaction request from the switching system(s) 113 and categorize one or more items identified in the transaction request. The categorization engine 231 may identify category and subcategory values associated with one or more items identified in a transaction request by checking against the appropriate APL file associated with the specific filtered access device 101 of the transaction request. In one embodiment, an APL file may have caused the items to be aggregated in multiple benefit categories, because the filtered transaction vehicle (e.g., access device 101) may have one or more benefits available, the most correct placement of those items may be determined (by the authorization system (s)129) using the aggregated categories determined by the categorization system(s) 127.

In one embodiment, the categorization engine 231 may utilize identification data (e.g., a BIN value, or card identifier) of a filtered transaction vehicle to associate the correct APL files for the transaction where the APL is a list of one to many items (e.g., UPC/PLU items) against which the items identified in a transaction request may be evaluated. The categorization engine 231 may then determine a category or a subcategory for each UPC/PLU item identified in the transaction request. The categorization engine 231 may then create a summary of total amounts allocated among one or more categories identified and provide that information for use by the authorization system(s) 129 in identification of the benefit purse types (e.g., HFC purse, OTC purse, and/or OTH purse) that can cover that portion of the transaction. In one embodiment, the categorization engine 231 may categorize and summarize the items that are not identified in the APL list as a generic category representing other items not permitted by the APL and for this example covered only by a purse capable of non-APL items (e.g. an OTH purse). Additionally, for any errors associated with the categorization process of this disclosure, all of the identified amounts may be categorized in the same generic category representing other items not permitted by the APL since categorization may not have occurred.

Completing step 227, the categorization system(s) 127 may transmit a result of the categorization to the switching system(s) 113 which may in turn, by initiating step 225, may provide this categorization information to the authorization system(s) 129. That is, the categorization system(s) 127 may generate a categorization response based on the one or more items of the transaction request that are categorized by the categorization engine 231 and the authorization system(s) 129 may determine which benefit amount can be applied, if any. For example, an individual benefit is described by one to many public and internal mapped categories which, using data provided in rules engine 115, correspond to a Healthy Food Choice (HFC) purse, an Over the Counter (OTC) purse, a combination thereof (CMB), and/or an Other (OTH) purse. Of course, any other suitable purses may be identified and established based on the products and items associated with merchants or entities that may participate in the filtered transaction or fall outside the merchant set (MCCs) for which filtering is then available or required. The one or more benefit purses may include pre-funded balances provided by a sponsoring entity of the filtered transaction of this disclosure. The authorization system(s) 129 may use the data provided by the categorization engine 231 and the purse definition and rules data to determine the most suitable purse set for the transaction. As such, one or more purses associated with a filtered transaction vehicle, if funded, may be utilized to purchase various items that may be eligible or ineligible for the filtered transaction in accordance with this disclosure.

At step 230, the authorization system(s) 129 may communicate with the issuer system(s) 111 to complete the transaction request initially transmitted from the merchant system(s) 105. For example, based on the categorization of the items identified in the transaction request, prepaid balances associated with the filtered transaction vehicle may be deducted or updated accordingly. The filtered transaction process of this disclosure may offer participants such as employers, consumer brands, healthcare, or insurance companies the means to encourage spending for specific purchases. That is, a beneficiary (e.g., cardholders may utilize the filtered transaction vehicle (e.g., prepaid card) to purchase items, such as, for example, over the counter medications (e.g., cough syrup, aspirin, bandages, etc.) as part of a corporate benefit or consumer brand incentive. Other use cases may include specific health food options, allowing cardholders to receive discounts on specific purchases contributing to overall health. Further, at step 233, the categorization system(s) 127 may allow the participating entities to categorize filtered items into categories, update categories in APL files, track individual product items identified in transaction requests, and perform reporting and analysis of the filtered items listed in the APL files and associated transaction requests. In one embodiment, the SKU level data in the enhanced data of a transaction request may be utilized to identify and update the filtered items in the APL files. In one instance, the plan administrator may manage the APL item contents and may also report on the purchased items.

Figure 3:
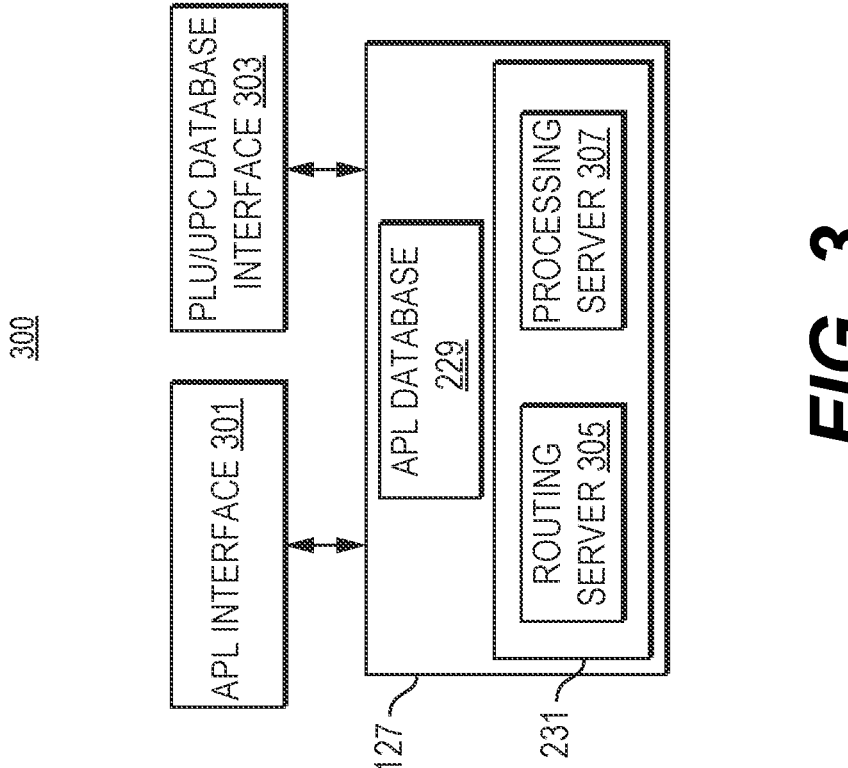
FIG. 3 provides a detailed example illustration of the categorization system(s), according to aspects of the disclosure.

FIG. 3 provides a detailed example illustration of the categorization system(s) 127, but should not be construed as limiting the categorization system(s) 127 or the system 100. As discussed in FIG. 2, the categorization system(s) 127 may include the APL database 229 and the categorization engine 231. The categorization system(s) 127 may be communicatively connected to an APL interface 301 and a PLU/UPC database interface 303.

In one embodiment, the categorization engine 231 may include one or more servers. For example, in system 300 the categorization engine 231 may include a routing server 305 and a processing server 307. In one embodiment, the routing server 305 may route a categorization request (or transaction request) received from the switching system(s) 113 to the processing server 307. In one embodiment, the processing server 307 may categorize one or more items associated with the categorization request (e.g., from ISO 8583 data elements 105 thru 108) to identify category and subcategory values associated with the one or more items of the categorization request by checking against appropriate APL files. The processing server 307 may communicate with the routing server 305 and the APL database 229 to execute the categorization process in accordance with the process 200 of FIG. 2 described above.

In one embodiment, the APL interface 301 may be configured to communicate with the categorization system(s) 127 to access one or more APL files in the APL database

229. The APL interface 301 may be provided as an app or a web service. In one embodiment, the APL interface 301 may display graphics primitives such as icons, bar graphs, menus, buttons, data entry fields, etc. In another embodiment, one or more APIs may cause interfacing of guidance information to include, at least in part, one or more annotations, audio messages, video messages, or a combination thereof. In one example embodiment, one or more API operates in connection with augmented reality (AR) processing techniques, wherein various applications, graphic elements, and features interact. The APL interface 301 may allow a user, merchant, or customer to access the APL files to check whether or not a particular item or product is being offered or provided by filtered transaction participants (e.g., vendors, employers, consumer brands, healthcare, insurance companies, etc.).

In one embodiment, the PLU/UPC database interface 303 may be configured to communicate with the categorization system(s) 127 to access one or more APL files including PLU/UPC data associated with items or products offered by a filtered transaction participant of this disclosure. For example, the filtered transaction participants (e.g., vendors, employers, consumer brands, healthcare, insurance companies, etc.) may utilize the PLU/UPC database interface 303 to review, track, and/or update the UPC/PLU data. For example, the filtered transaction participants may add or update information associated with a UPC/PLU item (e.g., descriptions of entry such as nutritional information, images, size, etc.). In one embodiment, the PLU/UPC database interface 303 may display graphics primitives such as icons, bar graphs, menus, buttons, data entry fields, etc. In another embodiment, one or more APIs may cause interfacing of guidance information to include, at least in part, one or more annotations, audio messages, video messages, or a combination thereof.

FIG. 4 is a flowchart of a process 400 for authenticating access devices and/or merchant systems and determining their contextual data for categorizing items associated with a transaction request, according to aspects of the disclosure. In various embodiments, the rules engine 115 and/or the data processing platform 117 may perform one or more portions of the process 400 and are implemented using, for instance, a chip set including a processor and a memory as shown in FIG. 6. As such, the rules engine 115 and/or the data processing platform 117 provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 are performed in any order or combination and need not include all of the illustrated steps.

In step 401, the issuer system(s) 111 via processor 602, may receive a request (e.g., a transaction request) from a first sub-system (e.g., merchant system(s) 105). The request may include a plurality of data (e.g., transaction data or any relevant data) associated with the access device 101, the status of the merchant system(s) 105 (e.g., participating merchant system, self-categorizing merchant system, or non-participating merchant system), or data types (e.g., enhanced data, lite-enhanced data, or non-enhanced data). The transaction request is transmitted by the switching system(s) 113 to the data processing platform 117 based, at least in part, on the attributes of the transaction data.

In step 403, the data processing platform 117 via processor 602, may utilize the transaction data and data from the rules engine 115 to determine whether the merchant system (s) 105 and/or the access device 101 has authorization to access a service (e.g., filtered spend service, access some of the funds associated to the transaction vehicle, etc.). In one embodiment, the rules engine 115 may authorize the merchant system(s) 105 and/or the access device 101 by configuring the RAN list, wherein the RAN list includes at least one of RAN MCC, RAN MID, or RAN network name. The rules engine 115 may compare transaction MCC, transaction MID, or transaction merchant system with the RAN MCC, the RAN MID, or the RAN network name to determine a match. The rules engine 115 may qualify one or more purses upon determining the transaction MCC, the transaction MID, or the transaction merchant system is approved by the RAN MCC, the RAN MID, or the RAN network name, respectively. In another embodiment, the rules engine 115 may normalize the transaction MID upon determining an unsuccessful match. The rules engine 115 may utilize the normalized MID to authenticate the merchant system. In one embodiment, the data processing platform 117, using data from the rules engine 115, may disqualify any purse determined to not accept the transaction based on MCC, the transaction MID (actual or normalized), or the RAN or MIEQ configuration.

In step 405, the data processing platform 117 using data from the rules engine 115, via processor 602, may determine contextual data of one or more purses associated with the access device 101 and/or status of the merchant system(s) 105. The contextual data may include the expiration date of one or more purses and/or one or more rules associated with one or more purses. In one embodiment, the rules engine 115 may monitor one or more purses to detect the amount credited to one or more purses near or after the expiration date. The rules engine 115 may override the expiration date of one or more purses to set an alternate expiration date to access the credited amount, wherein the alternate expiration date is based on a pre-determined duration.

In another embodiment, the rules engine 115 may determine one or more dependent accounts linked to a primary account associated with one or more purses. The rules engine 115 may reconfigure one or more rules to limit access to the primary account by one or more dependent accounts and/or adjust purse priorities for the usage of available funds in one or more purses. The rules engine 115 may communicate, in real-time or near real-time, with the data processing platform 117 to transmit the contextual data of one or more purses associated with the transaction vehicle and/or status of the merchant system.

In step 407, the issuer system(s) 111 and switching system(s) 113, via processor 602, may transmit the transaction request to a second sub-system (e.g., categorization system(s) 127) based on the existence of enhanced data and/or status of the merchant system for categorizing one or more items associated with the request into one or more categories. The categorization engine 231 may determine the correct APL to apply based on the access device 101 and categorizes one or more items associated with the transaction request into one or more categories. In one embodiment, the issuer system(s) 111 may determine the merchant system is a participating merchant system. The issuer system(s) 111 may transmit the transaction request to a third sub-system (e.g., switching system(s) 113), and the switching system(s) 113 may determine the transaction data includes enhanced data. The switching system(s) 113 may transmit the transaction request with the enhanced data to the categorization system.

In one embodiment, the categorization engine 231 of the categorization system(s) 127 may identify category and subcategory values associated with one or more items identified in the transaction request by checking the APL in a database. In one embodiment, the categorization system(s) 127 manages the content of the approved product list in the database. For example, the participating merchant system may add filtered items to, or removes the filtered items from, APL database inventory system product list in the database. The sponsor of the access device 101 may add, remove, or re-categorize the APL. In one embodiment, the enhanced data may include SKU data, and the SKU data includes a unique identifier each item sold by the participating merchant system.

In another embodiment, the switching system(s) 113 via processor 602, may determine the transaction data does not include item level detail and routes the transaction to the data processing platform 117. This may occur when a self-categorizing merchant system 203 has provided self-categorized data, or a non-participating merchant system 205 has provided a standard authorization message without enhanced data. If the data processing platform 117 determines it has received no category data and the merchant system(s) 105 was required to provide enhanced data, the rules engine 115 may be consulted to determine if there is configured alternative to the missing enhanced data for the merchant system. In one embodiment, the self-categorized data includes data categorized by the self-categorizing merchant system 203 that correspond to one more items provided by the self-categorizing merchant system 203. In one embodiment, the data processing platform 117, using data from the rules engine 115, may identify a single category which may be applied to select the purse(s) for the transaction.

In step 409, the data processing platform 117 via processor 602, executes the transaction request based on one or more categories per processes described herein.

One or more implementations disclosed herein include and/or are implemented using a machine learning model. For example, one or more of the components of the rules engine 115, e.g., the machine learning module 125, are implemented using a machine learning model and/or are used to train the machine learning model. A given machine learning model is trained using the training flow chart 500 of FIG. 5. Training data 512 includes one or more of stage inputs 514 and known outcomes 518 related to the machine learning model to be trained. Stage inputs 514 are from any applicable source including text, visual representations, data, values, comparisons, and stage outputs, e.g., one or more outputs from one or more steps from FIG. 4. The known outcomes 518 are included for the machine learning models generated based on supervised or semi-supervised training. An unsupervised machine learning model may not be trained using known outcomes 518. Known outcomes 518 includes known or desired outputs for future inputs similar to or in the same category as stage inputs 514 that do not have corresponding known outputs.

The training data 512 and a training algorithm 520, e.g., one or more of the modules implemented using the machine learning model and/or are used to train the machine learning model, is provided to a training component 530 that applies the training data 512 to the training algorithm 520 to generate the machine learning model. According to an implementation, the training component 530 is provided comparison results 516 that compare a previous output of the corresponding machine learning model to apply the previous result to re-train the machine learning model. The comparison results 516 are used by training component 530 to update the corresponding machine learning model. The training algorithm 520 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the process illustrated in FIG. 4 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

FIG. 6 illustrates an implementation of a computer system that executes techniques presented herein. The computer system 600 includes a set of instructions that are executed to cause the computer system 600 to perform any one or more of the methods or computer based functions disclosed herein. The computer system 600 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 600 operates in the capacity of a server or as a client user computer in a server-client user network environment, or as a peer computer system in a peer-to-peer (or distributed) network environment. The computer system 600 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 is implemented using electronic devices that provide voice, video, or data communication. Further, while the computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics processing unit (GPU), or both. The processor 602 is a component in a variety of systems. For example, the processor 602 is part of a standard personal computer or a workstation. The processor 602 is one or more processors, digital signal processors, application specific integrated circuits, field programmable gate arrays, servers, networks, digital circuits, analog circuits, combinations thereof, or other now known or later developed devices for analyzing and processing data. The processor 602 implements a software program, such as code generated manually (i.e., programmed).

The computer system 600 includes a memory 604 that communicates via bus 608. Memory 604 is a main memory, a static memory, or a dynamic memory. Memory 604 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. Memory 604 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts, or tasks illustrated in the figures or described herein are performed by processor 602 executing the instructions stored in memory 604. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 600 further includes a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 acts as an interface for the user to see the functioning of the processor 602, or specifically as an interface with the software stored in the memory 604 or in the drive unit 606.

Additionally or alternatively, the computer system 600 includes an input/output device 612 configured to allow a user to interact with any of the components of the computer system 600. The input/output device 612 is a number pad, a keyboard, a cursor control device, such as a mouse, a joystick, touch screen display, remote control, or any other device operative to interact with the computer system 600.

The computer system 600 also includes the drive unit 606 implemented as a disk or optical drive. The drive unit 606 includes a computer-readable medium 622 in which one or more sets of instructions 624, e.g. software, is embedded. Further, the sets of instructions 624 embodies one or more of the methods or logic as described herein. Instructions 624 resides completely or partially within memory 604 and/or within processor 602 during execution by the computer system 600. The memory 604 and the processor 602 also include computer-readable media as discussed above.

In some systems, computer-readable medium 622 includes the set of instructions 624 or receives and executes the set of instructions 624 responsive to a propagated signal so that a device connected to network 630 communicates voice, video, audio, images, or any other data over network 630. Further, the sets of instructions 624 are transmitted or received over the network 630 via the communication port or interface 620, and/or using the bus 608. The communication port or interface 620 is a part of the processor 602 or is a separate component. The communication port or interface 620 is created in software or is a physical connection in hardware. The communication port or interface 620 is configured to connect with the network 630, external media, display 610, or any other components in the computer system 600, or combinations thereof. The connection with network 630 is a physical connection, such as a wired Ethernet connection, or is established wirelessly as discussed below. Likewise, the additional connections with other components of the computer system 600 are physical connections or are established wirelessly. Network 630 alternatively be directly connected to the bus 608.

While the computer-readable medium 622 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 622 is non-transitory, and may be tangible.

The computer-readable medium 622 includes a solid-state memory such as a memory card or other package that houses one or more non-volatile read-only memories. The computer-readable medium 622 is a random-access memory or other volatile re-writable memory. Additionally or alternatively, the computer-readable medium 622 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium.

Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 600 is connected to network 630. Network 630 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 630 includes wide area networks (WAN), such as the Internet, local area networks (LAN), campus area networks, metropolitan area networks, a direct connection such as through a Universal Serial Bus (USB) port, or any other networks that allows for data communication. Network 630 is configured to couple one computing device to another computing device to enable communication of data between the devices. Network 630 is generally enabled to employ any form of machine-readable media for communicating information from one device to another. Network 630 includes communication methods by which information travels between computing devices. Network 630 is divided into sub-networks. The sub-networks allow access to all of the other components connected thereto or the sub-networks restrict access between the components. Network 630 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A system comprising:

one or more processors; and at least one non-transitory computer readable medium storing instructions which, when executed by the one or more processors, cause the one or more processors to perform operations comprising:

receiving a request from a first sub-system, wherein the request includes a plurality of data associated with an access device;

determining the first sub-system, the access device, or a combination thereof has authorization to access a service;

determining contextual data of one or more purses associated with the access device, status of the first sub-system, or a combination thereof, wherein the contextual data includes an initial expiration date of the one or more purses, one or more rules associated with the one or more purses, or a combination thereof, wherein each of the one or more purses includes a time-limited store value balance maintained for the access device, wherein determining the contextual data of the one or more purses, further comprises:

monitoring, by a first machine learning model, the one or more purses to detect amounts credited to the one or more purses near or after the initial expiration date; and automatically setting, by the first machine learning model, without, without user intervention, an alternate expiration date to access the credited amount, wherein the alternate expiration date is based on a pre-determined duration, and the alternate expiration date is after the initial expiration date;

transmitting the request to a second sub-system based, at least in part, on the contextual data, the status of the first sub-system, or a combination thereof for categorizing one or more items associated with the request into one or more categories; and executing the request, after the initial expiration date and before the alternative expiration date, based on the one or more categories.

2. The system of claim 1, wherein determining the first sub-system and/or the access device has authorization to access the service, further comprises:

configuring a restricted authorization network (RAN) list, wherein the RAN list includes at least one of: RAN merchant category code (MCC), RAN merchant identification (MID), or RAN network name; and comparing, by utilizing a second machine learning model, transaction MCC, transaction MID, or transaction merchant system associated with the request with the RAN MCC, the RAN MID, or the RAN network name to determine a match.

3. The system of claim 2, further comprising:

qualifying the one or more purses upon determining the transaction MCC, the transaction MID, or the transaction merchant system is approved by the RAN MCC, the RAN MID, or the RAN network name, respectively.

4. The system of claim 2, further comprising:

normalizing the transaction MCC, the transaction MID, or a combination thereof upon determining an unsuccessful match; and utilizing the normalized MCC, the normalized MID, or a combination thereof to authenticate the first sub-system.

5. The system of claim 1, wherein determining the contextual data of the one or more purses, further comprises:

determining one or more dependent accounts linked to a primary account associated with the one or more purses; and reconfiguring the one or more rules to limit access to the primary account by the one or more dependent accounts, adjust purse priorities for usage of available funds in the one or more purses, or a combination thereof.

6. The system of claim 1, wherein transmitting the request to the second sub-system, further comprises:

determining the first sub-system is a participating system or a self-categorizing system;

transmitting the request to a third sub-system, wherein the third sub-system determines the plurality of data includes enhanced data; and transmitting, by the third sub-system, the request with the enhanced data to the second sub-system.

7. The system of claim 6, further comprising:

identifying, by the second sub-system, category and sub-category values associated with the one or more items identified in the request by checking an approved product list in a database.

8. The system of claim 7, wherein the second sub-system manages content of the approved product list in the database, and wherein the participating system or the self-categorizing system adds filtered items to or removes the filtered items from a potential product list in the database.

9. The system of claim 6, wherein the enhanced data includes stock keeping unit data, and wherein the stock keeping unit data includes a unique identifier for one or more items sold by the participating system.

10. The system of claim 1, wherein transmitting the request to the second sub-system, further comprises:

determining the first sub-system is a self-categorizing system or a non-participating system;

transmitting the request to a switching system, wherein the switching system determines the plurality of data is missing item level details; and determining a configured alternative to the item level details for the self-categorizing system or the non-participating system.

11. A computer-implemented method, comprising:

receiving, by one or more processors, a request from a first sub-system, wherein the request includes a plurality of data associated with an access device;

determining, by the one or more processors, the first sub-system, the access device, or a combination thereof has authorization to access a service;

determining, by the one or more processors, contextual data of one or more purses associated with the access device, status of the first sub-system, or a combination thereof, wherein the contextual data includes an initial expiration date of the one or more purses, one or more rules associated with the one or more purses, or a combination thereof, wherein each of the one or more purses includes a time-limited store value balance maintained for the access device, wherein determining the contextual data of the one or more purses, further comprises:

monitoring, by a first machine learning model, the one or more purses to detect amounts credited to the one or more purses near or after the initial expiration date; and automatically setting, by the first machine learning model, without user intervention, an alternate expiration date to access the credited amount, wherein the alternate expiration date is based on a predetermined duration, and the alternate expiration date is after the initial expiration date;

transmitting, by the one or more processors, the request to a second sub-system based, at least in part, on the contextual data, the status of the first sub-system, or a combination thereof for categorizing one or more items associated with the request into one or more categories; and executing, by the one or more processors, the request based on the one or more categories.

12. The computer-implemented method of claim 11, wherein determining the first sub-system and/or the access device has authorization to access the service, further comprises:

configuring, by the one or more processors, a restricted authorization network (RAN) list, wherein the RAN list includes at least one of: RAN merchant category code (MCC), RAN merchant identification (MID), or RAN network name; and comparing, by utilizing a second machine learning model, transaction MCC, transaction MID, or transaction merchant system associated with the request with the RAN MCC, the RAN MID, or the RAN network name to determine a match.

13. The computer-implemented method of claim 12, further comprising:

qualifying, by the one or more processors, the one or more purses upon determining the transaction MCC, the transaction MID, or the transaction merchant system is approved by the RAN MCC, the RAN MID, or the RAN network name, respectively.

14. The computer-implemented method of claim 12, further comprising:

normalizing, by the one or more processors, the transaction MCC, the transaction MID, or a combination thereof upon determining an unsuccessful match; and utilizing, by the one or more processors, the normalized MCC, the normalized MID, or a combination thereof to authenticate the first sub-system.

15. The computer-implemented method of claim 11, wherein determining the contextual data of the one or more purses, further comprises:

determining, by the one or more processors, one or more dependent accounts linked to a primary account associated with the one or more purses; and reconfiguring, by the one or more processors, the one or more rules to limit access to the primary account by the one or more dependent accounts, adjust purse priorities for usage of available funds in the one or more purses, or a combination thereof.

16. The computer-implemented method of claim 11, wherein transmitting the request to the second sub-system, further comprises:

determining, by the one or more processors, the first sub-system is a participating system or a self-categorizing system;

transmitting, by the one or more processors, the request to a third sub-system, wherein the third sub-system determines the plurality of data includes enhanced data; and transmitting, by the third sub-system via the one or more processors, the request with the enhanced data to the second sub-system.

17. A non-transitory computer readable medium, the non-transitory computer readable medium storing instructions which, when executed by one or more processors, cause the one or more processors to perform operations, comprising:

receiving a request from a first sub-system, wherein the request includes a plurality of data associated with an access device;

determining the first sub-system, the access device, or a combination thereof has authorization to access a service;

determining contextual data of one or more purses associated with the access device, status of the first sub-system, or a combination thereof, wherein the contextual data includes an initial expiration date of the one or more purses, one or more rules associated with the one or more purses, or a combination thereof, wherein each of the one or more purses includes a time-limited store value balance maintained for the access device, wherein determining the contextual data of the one or more purses, further comprises:

monitoring, by a first machine learning model, the one or more purses to detect amounts credited to the one or more purses near or after the initial expiration date; and automatically setting, by the first machine learning model, without user intervention, an alternate expiration date to access the credited amount, wherein the alternate expiration date is based on a predetermined duration, and the alternate expiration date is after the initial expiration date;

transmitting the request to a second sub-system based, at least in part, on the contextual data, the status of the first sub-system, or a combination thereof for categorizing one or more items associated with the request into one or more categories; and executing the request based on the one or more categories.

18. The non-transitory computer readable medium of claim 17, wherein determining the first sub-system and/or the access device has authorization to access the service, further comprises:

configuring a restricted authorization network (RAN) list, wherein the RAN list includes at least one of: RAN merchant category code (MCC), RAN merchant identification (MID), or RAN network name;

comparing, by utilizing a second machine learning model, transaction MCC, transaction MID, or transaction merchant system associated with the request with the RAN MCC, the RAN MID, or the RAN network name to determine a match; and qualifying the one or more purses upon determining the transaction MCC, the transaction MID, or the transaction merchant system is approved by the RAN MCC, the RAN MID, or the RAN network name, respectively.

* * * * *